(12) United States Patent
Hada et al.

(10) Patent No.: US 7,353,666 B2
(45) Date of Patent: Apr. 8, 2008

(54) METHOD FOR PRESS MOLDING A GLASS OPTICAL ELEMENT

(75) Inventors: Shinji Hada, Tokyo (JP); Hiroyuki Sakai, Tokyo (JP); Tadayuki Fujimoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 587 days.

(21) Appl. No.: 10/772,451

(22) Filed: Feb. 6, 2004

(65) Prior Publication Data

US 2004/0156947 A1 Aug. 12, 2004

(30) Foreign Application Priority Data

Feb. 6, 2003 (JP) .............................. 2003-029966

(51) Int. Cl.
C03B 11/08 (2006.01)
C03B 11/16 (2006.01)

(52) U.S. Cl. .................... 65/29.12; 65/29.19; 65/29.1; 65/102; 65/160; 65/305; 65/322

(58) Field of Classification Search ............... 65/29.12, 65/29.1, 102, 322, 160; 425/412
See application file for complete search history.

(56) References Cited

U.S. PATENT DOCUMENTS

| | | | | |
|---|---|---|---|---|
| 4,836,838 A | * | 6/1989 | Hirota et al. ................. | 65/308 |
| 5,085,570 A | * | 2/1992 | Leinweber .................. | 425/195 |
| 5,264,016 A | * | 11/1993 | Komiyama ................. | 65/29.1 |
| 5,282,878 A | * | 2/1994 | Komiyama et al. ........... | 65/162 |
| 5,346,522 A | * | 9/1994 | Komiyama et al. ............ | 65/64 |
| 5,938,807 A | * | 8/1999 | Komiyama et al. ........ | 65/29.12 |
| 5,944,646 A | * | 8/1999 | Weder et al. ................. | 493/84 |
| 6,928,838 B2 | * | 8/2005 | Murakoshi et al. ........... | 65/102 |
| 7,108,812 B2 | * | 9/2006 | Hosoe ........................ | 264/2.5 |
| 7,134,298 B2 | * | 11/2006 | Fukuyama et al. ........ | 65/29.19 |
| 7,143,617 B2 | * | 12/2006 | Futamura et al. ............ | 72/20.1 |
| 2003/0182964 A1 | * | 10/2003 | Fukuyama et al. ........ | 65/29.11 |
| 2004/0212110 A1 | * | 10/2004 | Fujimoto et al. .......... | 264/1.32 |
| 2005/0279137 A1 | * | 12/2005 | Fukuyama et al. ........... | 65/162 |
| 2006/0059949 A1 | * | 3/2006 | Fujimoto .................... | 65/32.5 |
| 2006/0090512 A1 | * | 5/2006 | Fujimoto et al. .......... | 65/29.19 |

FOREIGN PATENT DOCUMENTS

| | | |
|---|---|---|
| JP | 61-205630 A | 9/1986 |
| JP | 8-165126 A | 6/1996 |
| JP | 2000-264652 A | 9/2000 |

* cited by examiner

Primary Examiner—Steven P. Griffin
Assistant Examiner—DeMaris R. Wilson
(74) Attorney, Agent, or Firm—Sughrue Mion, PLLC

(57) ABSTRACT

A molding apparatus for molding a press-molded product by heating and softening a material and press-molding the material into a predetermined shape by the use of a mold, includes a pair of dies which form the mold, each of which comprises a molding surface facing with the other, and one of which is fixed to a structure member of the molding apparatus, driving means for moving the other die towards and away from the one die, heating means for heating the dies, detecting means for detecting the displacement of a part displaced by thermal deformation of the structure member, and a control section for calculating a correction value for a moving distance of the other die with reference to the result of detection by the detecting means and delivering an instruction to the driving means so as to move the other die in accordance with the moving distance corrected by the correction value.

6 Claims, 5 Drawing Sheets

METHOD FOR PRESS MOLDING A GLASS OPTICAL ELEMENT

This application claims priority to prior Japanese patent application JP 2003-29966, the disclosure of which is incorporated herein by reference.

BACKGROUND OF THE INVENTION

This invention relates to a molding technique for producing a molded product having a predetermined shape by press-molding and, in particular, to a molding apparatus and a molding method which are suitable for press-molding of a glass optical element, such as a lens, a prism, a mirror, and a diffraction grating and which do not require grinding and polishing after press-molding. This invention also relates to a molding method for producing a glass optical element as the molded product.

In the field of the molding technique for producing a molded product, for example, a glass optical element such as a lens, by press-molding, there is known a method of controlling the thickness of the optical element by contact between upper and lower dies of a mold, by contact between the upper or the lower die and another member, or by the use of a positioning member, such as a stopper, for stopping the upper or the lower die when they are spaced at a predetermined distance. For example, the above-mentioned method is disclosed in Japanese Patent application Publications (JP-A) Nos. S61-205630 (Reference 1) and 2000-264652 (Reference 2).

However, if the thickness is controlled by the contact between the dies or between the die and another member, sink marks or the like will be caused to occur when the volume of a glass in the mold is reduced during a cooling/solidifying process. In view of the above, it is proposed in Reference 1 to further press the mold by the use of an elastic member or the like following the shrinkage of the glass during the cooling/solidifying process.

On the other hand, Reference 2 discloses the technique related to a molding apparatus comprising a fixed die (upper die) and a movable die (lower die) faced to each other. The fixed die is fixed by a die holder to the center of a ceiling of a housing defining a molding chamber. In this technique, the molding apparatus comprises mold driving means for driving the movable die, a stopper for stopping the movable die at a predetermined position where the distance between the movable die and the fixed die corresponds to a thickness having a predetermined ratio with respect to a final thickness of the optical element, position detecting means for detecting a stop position of the movable die stopped by the stopper, stopper driving means for changing the position of the stopper between a locking position and an unlocking position where the movable die is inhibited and allowed to move, respectively, and for adjusting the stop position of the movable die with reference to an output of the position detecting means, and a controller for controlling the stopper driving means and the mold driving means.

In the technique described in Reference 1, the mold is pressed by the elastic member. By such pressing using the elastic member, however, it is impossible to control the load. In press-molding, it is generally impossible to achieve high surface accuracy unless a pressing force and a mold position are finely and precisely controlled even after the molded product is pressed to a predetermined thickness. Particularly, for an optical element having a concave meniscus shape or a biconcave shape, surface accuracy is difficult to achieve. Thus, it is an important problem to accurately control the pressing force (the magnitude of the pressing force and the change with time thereof and the mold position during pressing.

In the technique described in Reference 2, it is impossible to prevent variation in thickness due to the displacement of the fixed die resulting from thermal deformation of the housing. In this technique, the position detecting means is disposed within the molding chamber in the vicinity of a mold portion. Since the mold portion is heated to a temperature around a glass transition temperature (for example, around 600° C.), the position detecting means commercially available does not withstand such a high temperature. Therefore, specially-designed position detecting means must be used. The position detecting means may be provided with cooling water circulating means for cooling or temperature control. However, this results in a complicated and large-sized structure of the position detecting means and in an adverse influence upon the temperature distribution within the molding chamber.

SUMMARY OF THE INVENTION

It is therefore an object of this invention to provide a molding apparatus which is for producing a press-molded product by press-molding a heated material such as a glass into a predetermined shape by the use of a mold and which is capable of finely and precisely controlling a pressing force and a mold position and compensating or correcting an influence of heat as precisely as possible so as to improve a molding accuracy of the press-molded product.

It is another object of this invention to provide a molding method executed by the above-mentioned molding apparatus.

It is still another object of this invention to provide a molding method for producing a glass optical element as a press-molded product obtained by the above-mentioned molding apparatus and/or the above-mentioned molding method.

The present inventors focused upon a structure member constituting a molding apparatus and fixing one of dies of a mold and found out that the object of this invention is achieved by correcting the traveling distance of the other die considering the displacement (thermal displacement) of a part displaced (thermally displaced) by thermal deformation of the structure member heated and deformed.

According to a first aspect of this invention, there is provided an apparatus for press molding a molding material into a press-molded product comprising a mold comprising a first die and a second die, each of the dies having a molding surface facing with the other, the first die being fixed to a structure member of the apparatus and the second die being movable, driving means for moving the second die toward and away from the first die, heating means for heating the first and second dies, detecting means for detecting a displacement of a part of the structure member, and a controller for calculating a correction value for a moving distance of the second die based on the detected displacement and controlling the driving means so that the second die moves a distance in accordance with the correction value.

With the above-mentioned structure, the detecting means, such as a laser sensor, detects the thermal displacement of the structure member, such as a housing forming the molding apparatus and a supporting member supporting the mold, as a factor affecting the accuracy of a fixing position of the one die. With reference to the result of detection, the correction value for the moving distance of the other die is calculated. In this manner, press-molding can be carried out at a high accuracy.

According to a second aspect of this invention, the apparatus further comprises a temperature controlling means. The detecting means is supported by a supporting member and a temperature of the supporting member is maintained in a predetermined range by the temperature controlling means.

With the above-mentioned structure, the detecting means can be constantly held at a predetermined position without an influence of heat so that the thermal displacement can be accurately detected.

According to a third aspect of this invention, there is provided an apparatus for press molding a molding material into a press-molded product comprising a mold comprising a first die and a second die, each of the dies having a molding surface facing with the other, the first die being fixed to a structure member of the apparatus and the second die being movable, driving means for moving the second die toward and away from the first die, heating means for heating the first and second dies, temperature detecting means for detecting a temperature of a part of the structure member, memory means for storing values of displacement in association with the temperatures of the part of the structure member; and a controller for calculating a correction value for a moving distance of the second die based on the detected temperature and a value of displacement corresponding thereto, and for controlling the driving means so that the second die moves a distance in accordance with the correction value.

With the above-mentioned structure, it is possible to predict the change in position of the one die with reference to the result of detection by the temperature detecting means disposed on the structure member, such as a housing of the molding apparatus or a supporting member supporting the one die. The above-mentioned prediction is possible by preliminarily obtaining the relationship between the temperature change of the structure member and the change in fixing position of the one die and storing the relationship in the memory section. With reference to the result of detection by the temperature detecting means and the memory content of the memory section, the correction value for the moving distance of the other die is calculated.

The object of this invention is achieved also by a method according to the following fourth through eighth aspects.

According to a fourth aspect of this invention, there is provided a method for press-molding a heated and softened molding material into a press-molded product by use of an apparatus, the apparatus comprising a first die and a second die, each of the dies having a molding surface facing with the other, the first die being fixed to a structure member of the apparatus and the second die being movable, driving means for moving the second die toward and away from the first die, and heating means for heating the first and second dies, the method comprising supplying a material between the first die and the second die, and press-molding the material with the first die and the second die, wherein a displacement of a part of the structure member due to heat is detected, a correction value for a moving distance of the second die is calculated based on the detected displacement, and the driving means is controlled so that the second die moves a distance in accordance with the correction value.

In the above-mentioned method, an optical sensor, such as a laser sensor, may be used as the detecting means for detecting the thermal displacement.

According to a fifth aspect of this invention, the displacement is detected prior to a press-molding in a press-molding cycle.

In this manner, it is possible to exclusively detect the thermal displacement of the one die as a result of heating except the displacement of the structure member due to the load acting upon the one die during press-molding.

The thermal displacement of the die fixed to the structure member may also be predicted by detecting the temperature of the structure member.

According to a sixth aspect of this invention, there is provided a method for press-molding a heated and softened molding material into a press-molded product by use of an apparatus, the apparatus comprising a first die and a second die, each of the dies having a molding surface facing with the other, the first die being fixed to a structure member of the apparatus and the second die being movable, driving means for moving the second die toward and away from the first die, and heating means for heating the first and second dies, the method comprising supplying a material between the first die and the second die, and press-molding the material with the first die and the second die, wherein a temperature of a part of the structure member is detected, a correction value for a moving distance of the second die is obtained based on information including the detected temperature and a value of displacement corresponding to the detected temperature as stored in memory, and the driving means is controlled so that the second die moves a distance in accordance with the correction value.

This invention is particularly suitable for press-molding of a glass optical element, such as a lens, a prism, a mirror, and a diffraction grating, which is required to be excellent in surface accuracy, profile accuracy, and finishing accuracy.

DESCRIPTION OF THE PREFERRED EMBODIMENTS

Figure 1:
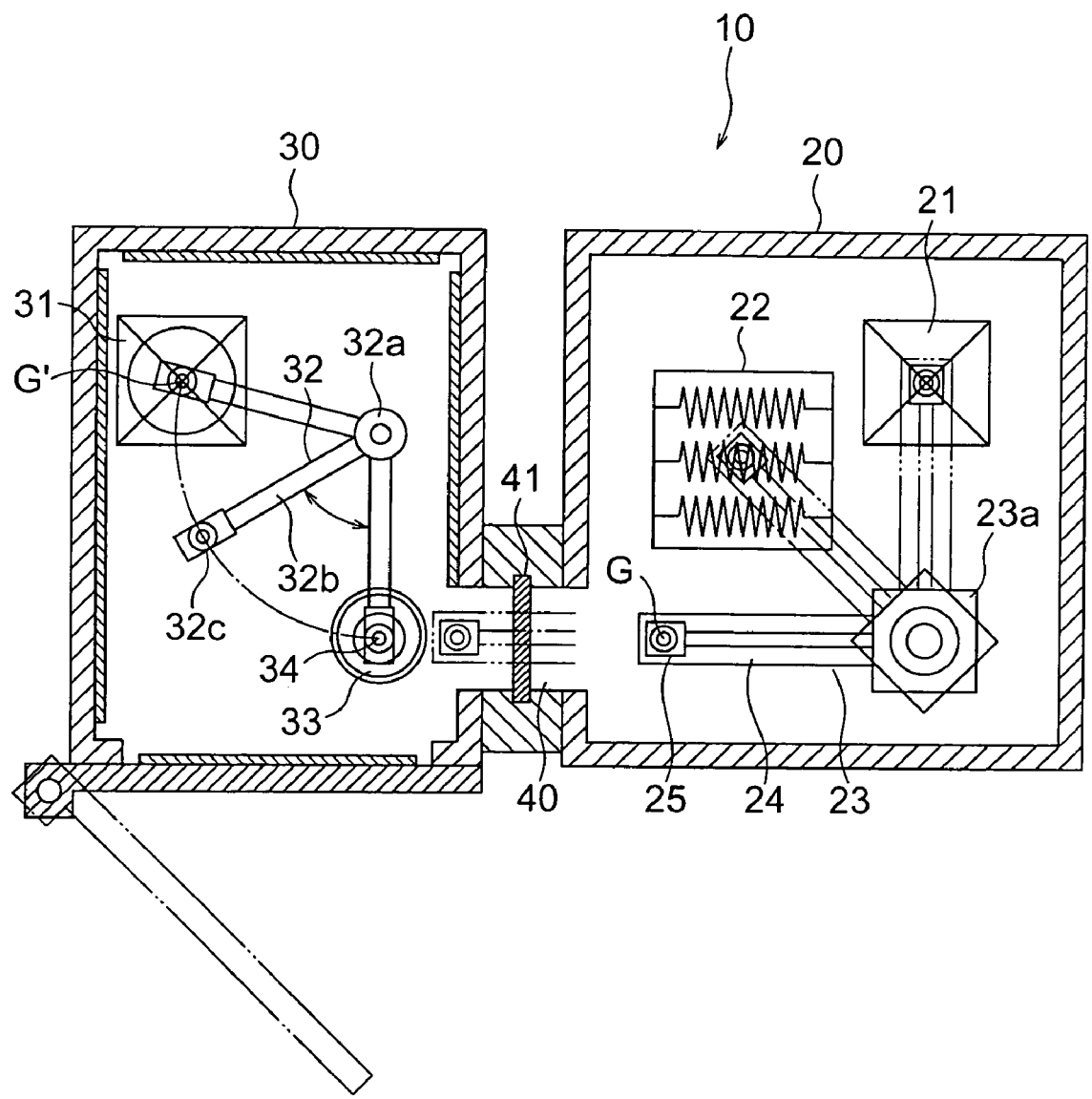
FIG. 1 is a schematic sectional plan view of a molding apparatus for producing a glass optical element according to a first embodiment of this invention.

Now, preferred embodiments of this invention will be described in detail with reference to the drawing.

First Embodiment

At first referring to FIG. 1, description will be made of a whole structure of a press-molding apparatus for producing a glass optical element according to a first embodiment of this invention.

The press-molding apparatus 10 illustrated in the figure has a heating chamber 20 and a molding chamber 30. The heating chamber 20 and the molding chamber 30 are connected through a passage 40 to communicate with each other. A combination of the heating chamber 20, the molding chamber 30, and the passage 40 forms a closed space isolated from the outside. The closed space is surrounded by an outer wall which may be formed by a stainless steel or any other suitable material. By the use of a sealing material at connecting portions, airtightness of the closed space is assured.

Upon molding the optical element, the closed space is put into a non-oxidizing gas atmosphere by evacuating air and filling a non-oxidizing gas instead of the air by the use of a gas exchange apparatus (not shown). As the non-oxidizing gas, a nitrogen gas is preferably used. The passage 40 allows gas exchange between the heating chamber 20 and the molding chamber 30. Therefore, during press-molding, the pressure, the concentration, and the temperature of the gas are substantially kept constant throughout the heating chamber 20 and the molding chamber 30.

The passage 40 is provided with an airtight valve 41. During maintenance and check of the molding chamber 30, the airtight valve 41 is closed so as to prevent a hot gas in the heating chamber 20 from flowing out towards the molding chamber 30.

The heating chamber 20 is an area where a glass material as a press-molding material is heated and softened prior to press-molding. In this embodiment, a preliminarily formed material to be subjected to press-molding (for example, a glass preform G) is used as the glass material.

The heating chamber 20 is equipped with a glass heating unit 22 and a handler (hereinafter called a transport handler) 23 for transporting the glass preform G. The transport handler 23 has a transporting path provided with an inlet portion 21 for supplying the glass preform G from the outside into the heating chamber 20.

The inlet portion 21 has an airtight inlet chamber (not shown) located between the heating chamber 20 and the outside so as to introduce the glass preform G with the heating chamber 20 kept airtight. The glass preform G supplied from the outside is at first introduced into the inlet chamber. After the inlet chamber is filled with the non-oxidizing gas, the glass preform G is introduced into the heating chamber 20 by opening a door of the heating chamber 20.

The transport handler 23 receives the glass preform G introduced from the inlet portion 21, transports the glass preform G to a heating area heated by the glass heating unit 22, and further transports the glass preform G after heated to the molding chamber 30. The transport handler 23 comprises an arm 24 and a floating plate 25 fixed to an end of the arm 24. The transport handler 23 holds the glass preform G on the floating plate 25 in a floating state. In this embodiment, the transport handler 23 has a driving portion 23a disposed in the heating chamber 20 and supporting the arm 24 horizontally. Driven by the driving portion 23a, the arm 24 is rotated on a horizontal plane at a rotation angle of about 90° The arm 24 is extendable and retractable in a radial direction around the driving portion 23a. With this structure, the arm 24 passes through the passage 40 to transport the glass preform G held on the floating plate 25 to the molding chamber 30.

The glass heating unit 22 serves to heat the glass preform G supplied thereto to a predetermined temperature corresponding to a predetermined viscosity (for example, a glass viscosity lower than $10^9$ poises). As the glass heating unit 22, use is preferably made of a heater utilizing resistance heating by a resistor element in order to stably heat the glass preform G to the predetermined temperature.

The glass heating unit 22 is disposed at an intermediate position of the transporting path of the glass preform G held on the arm 24 so as to heat the glass preform G during transportation of the glass preform G. Herein, the arm 24 may be stopped on the glass heating unit 22 to heat the glass preform G. Such a mode of heating is determined depending upon the time required to heat the glass preform G.

On the other hand, the molding chamber 30 is an area where the glass preform G preliminarily heated in the heating chamber 20 is press-molded to produce a glass optical element G' having a desired shape. For example, the molding chamber 30 may be formed by the use of austenite stainless steel SUS304. The molding chamber 30 is equipped with a pressing unit 33, a handler (hereinafter called a delivery handler) 32 for delivering the glass optical element G', and a delivering portion 31 for delivering the glass optical element G' after press-molded to the outside. An end portion of the delivery handler 32 may be preliminarily heated by a preheat furnace (not shown) to a preselected temperature. The delivering portion 31 is provided with a delivering chamber (not shown) filled with a non-oxidizing gas so as to deliver the glass optical element G' to the outside with the molding chamber 30 kept airtight. The glass optical element G' supplied from the delivery handler 32 is at first introduced into the delivering chamber and is thereafter delivered to the outside.

The pressing unit 33 receives the glass preform G transported by the transport handler 23 from the heating chamber 20 and presses the glass preform G to mold the glass optical element G' having a desired shape. The pressing unit 33 has a mold comprising a pair of dies, i.e., an upper die 52a and a lower die 52b faced to each other. The glass preform G supplied between the upper and the lower dies 52a and 52b is pressed by the upper and the lower dies 52a and 52b to mold the glass optical element G'. Around the mold, a mold heating unit 34 as preheating means for heating the mold is disposed. Preferably, the mold heating unit 34 is of the type utilizing high-frequency induction heating. Prior to press-molding of the glass preform G, the mold is heated by the mold heating unit 34 and is kept at a predetermined temperature. The temperature of the mold upon press-molding may be substantially equal to or lower than the temperature of the glass preform G preliminarily heated.

The delivery handler 32 delivers the glass optical element G' press-molded by the pressing unit 33 to the delivering portion 31. The delivery handler 32 has a driving portion 32a, an arm 32b rotatably supported by the driving portion 32a, and a suction pad 32c attached to an end of the arm 32b. The suction pad 32c sucks the glass optical element G' on the lower die 52b of the mold by vacuum sucking to enable transportation by the delivery handler 32. The glass optical element G' thus sucked is transported by the rotation of the arm 32b to a position below the delivering portion 31 and placed on elevating means (not shown) disposed at that position. After the arm 32b is retracted, the elevating means is moved upward and the glass optical element G' is transferred to the delivering portion 31.

Figure 2A:
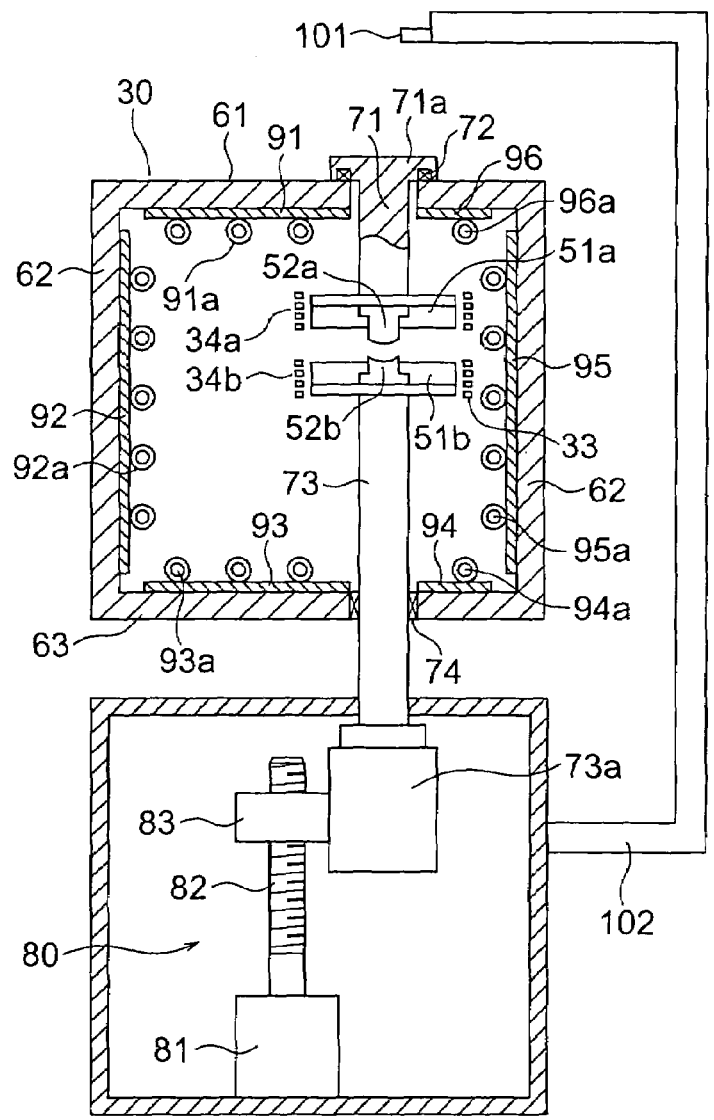
FIG. 2A is a schematic sectional view of a molding chamber and a pressing unit in the first embodiment.

Referring to FIG. 2A, the pressing unit 33 in the molding chamber 30 will be described in detail.

The pressing unit 33 generally comprises a pair of upper and lower mother dies 51a and 51b, the upper die 52a attached to the upper mother die 51a, and the lower die 52b attached to the lower mother die 52b.

The upper and the lower dies 52a and 52b have surfaces faced to each other and provided with molding surfaces each of which has a spherical or an aspherical shape corresponding to the shape of the glass optical element G' to be molded.

The upper mother die 51a with the upper die 52a attached thereto is fixed to a ceiling portion 61 of the molding chamber 30 and mounted to a lower end of a support post 71 extending along an optical axis of the optical element G' to be molded. The support post 71 has an upper end protruding through the ceiling portion 61 to the outside. The support post 71 has a flange portion 71a formed at the upper end thereof. Between the flange portion 71a and the ceiling portion 61, a sealing member 72, such as a fluorine rubber, is interposed so as to keep the airtightness of the molding chamber 30.

The lower mother die 51b with the lower die 52b attached thereto is fixed to an upper end of a support shaft 73 extending coaxially with the support shaft 71. The support shaft 73 passes through a via hole formed in a bottom portion 63 of the molding chamber 30 to protrude outside. Between an outer peripheral surface of the support post 73 and an inner peripheral wall of the via hole in the bottom portion 63, a sealing member 74, such as a fluorine rubber, is interposed to keep the molding chamber 30 airtight.

Below the support post 73, driving means 80 is disposed which serves to move the lower die 52b towards and away from the upper die 52a. The driving means 80 comprises a servo motor 81, a screw shaft 82 rotated by driving the servo motor 81, and a nut 83 attached to a side surface of a lower end 73a of the support post 73 and forming a ball-screw/nut mechanism together with the screw shaft 82.

With the above-mentioned structure, when the servo motor 81 is driven and the screw shaft 82 is rotated, the rotation is converted by the nut 83 into the movement in parallel to an axis of the support post 73 to move the support shaft 73, the mother die 51b, and the lower die 52b along the axis coincident with that of the support post 71.

The servo motor 81 is driven under control of a control section 87 which will later be described. The control section 87 serves to finely and very precisely control the pressing force, the pressing time, and the pressing timing for the glass preform G between the upper and the lower dies 52a and 52b.

The upper and the lower mother dies 51a and 51b are surrounded by induction heating coils 34a and 34b forming the mold heating unit 34 for preheating the upper and the lower dies 52a and 52b, respectively. The induction heating coils 34a and 34b serve to preheat the upper and the lower dies 52a and 52b to a predetermined temperature by induction heating prior to press molding, respectively. For example, the upper and the lower dies 52a and 52b are preheated by the induction heating coils 34a and 34b to a temperature slightly lower than the temperature of the glass preform G transferred from the heating chamber 20 (specifically, to a temperature required to make the glass preform G have a viscosity of $10^8$ to $10^{12}$ poises).

As illustrated in FIG. 2, the press molding apparatus according to this invention may be provided with cooling means for suppressing thermal deformation of a housing (formed by the ceiling portion 61, the side wall portion 62, and the bottom portion 63) as a structure member of the molding chamber 30. For example, a plurality of cooling plates 91 through 96 made of copper having a high heat conductivity and being a nonmagnetic material may be arranged between the induction heating coils 34a and 34b and an inner wall of the molding chamber 30. The cooling plates 91 through 96 are adhered to all of inner wall surfaces of the molding chamber 30. In order prevent the ceiling portion 61 from being inclined due to non-uniform thermal deformation of the side wall portion 62, the housing may be provided with temperature control means. For example, as cooling means or temperature control means, a fluid kept at a predetermined temperature is circulated. As illustrated in FIG. 2, a plurality of copper pipes 91a through 96a for circulating cooling water may be disposed on surfaces of the cooling plates 91 through 96 on the side facing the mold heating unit 34 as a heat source for the purpose of improvement in coolability.

The copper pipes 91a through 96a may be attached to the cooling plates 91 through 96 by soldering. The copper pipes 91a through 96a may be disposed either inside the molding chamber 30 as illustrated in the figure or outside the molding chamber 30. In case where the copper pipes 91a through 96a are disposed inside the molding chamber 30, cooling is effectively carried out because the distance from the induction heating coils 34a and 34b as the heat source is small.

In the mold having the above-mentioned structure, the glass preform G introduced by the transport handler 23 from the heating chamber 20 to the molding chamber 30 is supplied between the upper and the lower dies 52a and 52b. Then, the lower die 52b is moved towards the upper die 52a and the glass preform G is press-molded. Thus, the glass optical element G' having a predetermined shape is produced.

In the meanwhile, when the upper and the lower dies 52a and 52b are preheated by the induction heating coils 34a and 34b, a portion of the housing as the structure member of the molding chamber 30, for example, the side wall portion 62 of the molding chamber 30 is heated by a part of the heat. Accordingly, the side wall portion 62 exhibits thermal deformation due to thermal expansion. In this event, the ceiling portion 61 may be thermally displaced along the optical axis of the glass optical element to be molded, changing the position of the upper die 52a.

Because of such an adverse influence owing to the thermal deformation of the structure member, it is difficult to improve the accuracy of the glass optical element G' beyond a certain limited level even if the servo motor 81 for moving the lower die 52b upward is controllably driven as precisely as possible. In particular, until the lapse of several hours after starting continuous press-molding, the temperature of the molding chamber 30 and the temperature of the atmosphere in the molding chamber 30 are changed so that the position of the upper die 52a is changed with the lapse of time. Therefore, it is necessary to correct the position of the upper die 52a every time when the glass optical element G' is press-molded. In this invention, instead of correcting the change in position of the upper die 52a, the moving distance of the lower die 52b is corrected so as to absorb the change in position of the upper die 52a. Thus, it is preferable to apply the method of this invention until at least a predetermined time lapses (or until a predetermined amount of pressed products are produced) after start of the continuous press-molding.

With reference to the drawing, description will hereinafter be made of an example of means for detecting the thermal displacement of the ceiling portion 61 with the upper die 52a attached thereto and for correcting the moving distance of the lower die 52b in response to the change in position of the upper die 52a.

In the first embodiment, a laser sensor 101 as a known optical sensor detects the thermal displacement of the ceiling portion 61, as illustrated in FIG. 2A. With reference to the result of detection, the servo motor 81 is controllably driven to correct the change in position of the upper die 52a.

As shown in FIG. 2A, the laser sensor 101 is disposed above the upper die 52a attached to the ceiling portion 61 of the molding chamber 30. In order to detect the thermal displacement of the ceiling portion 61, the laser sensor 101 detects the change in position of the flange portion 71a at the upper end of the support post 71 connecting the upper die 52a to the ceiling portion 61.

The laser sensor 101 is supported by a fixing portion disposed outside the molding chamber 30, for example, a supporting member 102 attached to an outer surface of a housing accommodating the servo motor 81 and the like. In this embodiment, the supporting member 102 comprises a hollow tubular member having an inner space supplied with a fluid (for example, water) kept at a constant temperature. With this structure, the thermal deformation of the supporting member 102 is suppressed so as to more accurately detect the thermal displacement of the fixed die 52a.

Figure 2B:
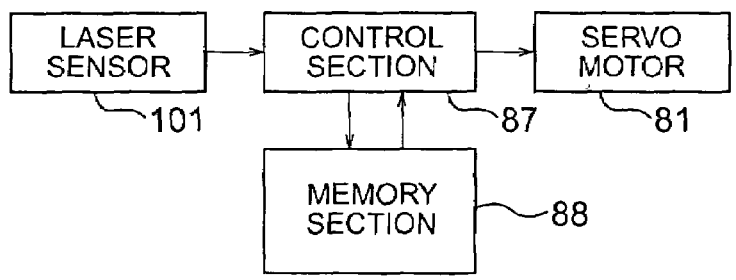
FIG. 2B is a block diagram of a control system for controllably driving a servo motor in the first embodiment.

Referring to FIG. 2B, the servo motor 81 is controllably driven by a control system illustrated in the figure.

The result of detection by the laser sensor 101 is supplied to an arithmetic processing unit of the control section 87 through a converting circuit (not shown). The control system has a memory section 88 for transmitting and receiving data to and from the control section 87. The memory section 88 stores the relationship between the thermal displacement of the structure member and the correction value for the servo motor 81. The arithmetic processing unit of the control section 87 reads the correction value from the memory section 88 with reference to the result of detection by the laser sensor 101 and corrects a predetermined moving distance of the lower die 52b by the correction value to determine the driving amount of the servo motor 81. The driving amount thus determined is given to the servo motor 81.

It is noted here that the detection of the thermal displacement of the ceiling portion 61 by the laser sensor 101 is preferably carried out at the timing when the pressing force is not applied during the press-molding cycle, for example, when the molding apparatus is stationary before the start of press-molding in order to exclude the displacement in height of the ceiling portion 61 owing to the load acting upon the upper die 51a during press-molding. Immediately downstream of the converting circuit connected to the laser sensor 101, a filter circuit is preferably arranged in order to remove abnormal position data owing to external vibration.

Second Embodiment

The thermal displacement of the ceiling portion 61 can also be predicted from the temperature change of the side wall portion 62 with the upper die 52a fixed thereto through the ceiling portion 61. Hereinafter, as a second embodiment of this invention, description will be made of a method of detecting the temperature of the side wall portion 62 and calculating, from the temperature change, the thermal displacement of the ceiling portion 61 and the correction value for the moving distance of the lower die 52b.

Similar parts are designated by like reference numerals and the detailed description thereof will be omitted.

Figure 3A:
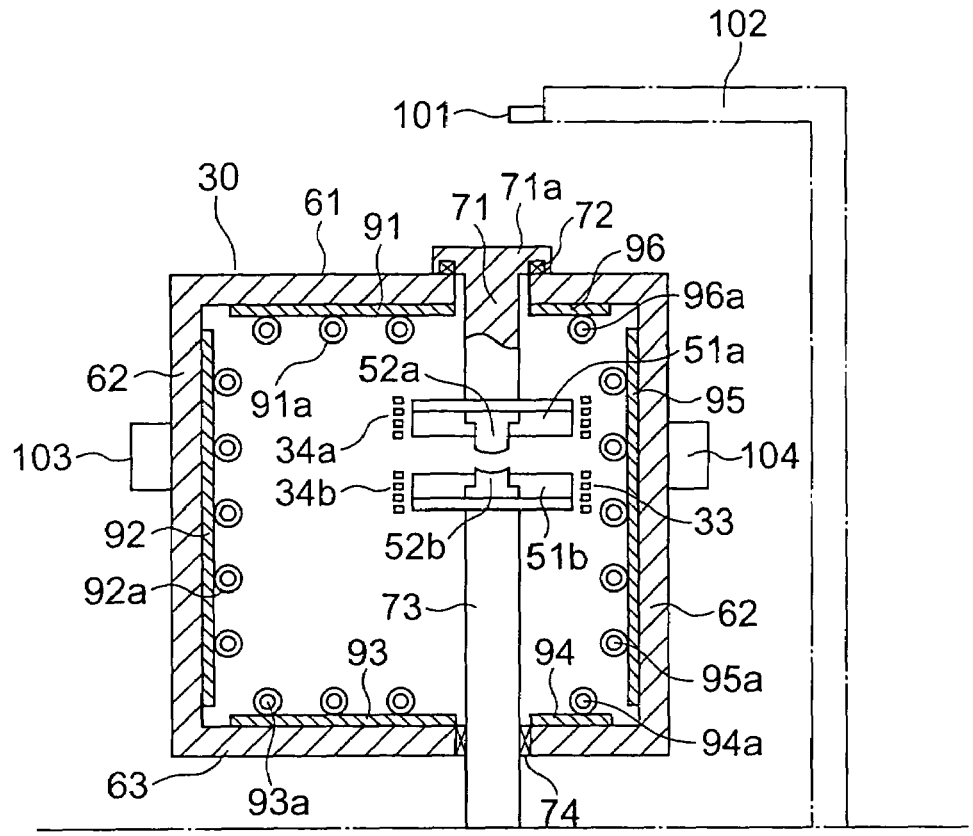
FIG. 3A is a schematic sectional view of a molding chamber and a pressing unit in a molding apparatus according to a second embodiment of this invention.
Figure 3B:
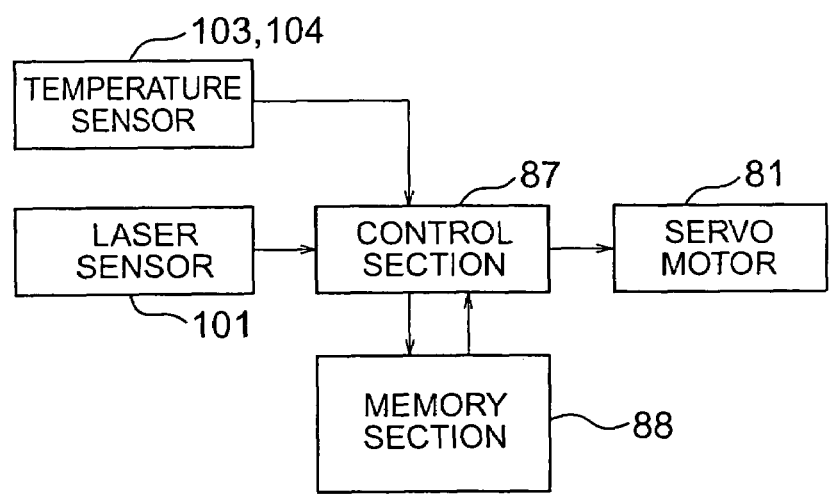
FIG. 3B is a block diagram of a control system for controllably driving a servo motor in the second embodiment.

In the second embodiment, the side wall portion 62 is provided with a plurality of temperature sensors 103 and 104 for detecting the temperatures, as illustrated in FIG. 3A. As illustrated in FIG. 3B, the servo motor 81 is controllably driven with reference to the results of detection by the temperature sensors 103 and 104 to correct the moving distance of the lower die 52b.

The temperature sensors 103 and 104 are preferably formed on those portions susceptible to thermal deformation by the heat source within the molding chamber 30. In this embodiment, the temperature sensors 103 and 104 are formed on side wall surfaces faced to the mold heating unit 34 and at portions causing the change in position of the ceiling portion 61 of the molding chamber 30. In order to obtain a more accurate correction value, three or more temperature sensors may be provided. As the temperature sensors 103 and 104, use may be made of a known thermal expansion sensor, a thermocouple, a resistance sensor, a heat radiation sensor capable of detecting the temperature of the structure member in a non-contact state.

In this embodiment, the relationship between the temperatures detected by the temperature sensors 103 and 104 and the displacement of the ceiling portion 61 detected by the laser sensor 101 in the manner similar to that in the first embodiment is preliminarily obtained prior to press-molding and stored in the memory section 88 as parameters. By preliminarily obtaining the relationship between the temperature of the side wall portion 62 and the displacement of the ceiling portion 61 as described above, it is possible to obtain the correction value for the moving distance of the lower die 52b from the results of detection by the temperature sensors 103 and 104 during the molding cycle.

As described above, the relationship between the temperature change of the side wall portion 62 and the thermal displacement of the ceiling portion 61 is preliminarily obtained and the displacement is not detected during the actual operation. In this manner, it is possible to prevent the adverse influence, such as external vibration, imposed upon the thermal displacement detecting means.

The relationship between the temperature change of the side wall portion 62 and the thermal displacement of the ceiling portion 61 may also be obtained from the coefficient of thermal expansion of a material of the side wall portion 62.

OPERATION OF THE MOLDING APPARATUS

Description will be made of a press-molding process according to this invention by the use of the molding apparatus having the above-mentioned structure.

(a) Heating Step

The upper and the lower dies 52a and 52b are heated by the high-frequency induction heating coils 34a and 34b to a predetermined temperature, respectively.

The detection of the thermal displacement of the ceiling portion 61 by the laser sensor 101 and calculation of the correction value with reference to the result of detection are carried out after the upper and the lower dies 52a and 52b are heated to the predetermined temperature.

(b) Supplying Step

Between the upper and the lower dies 52a and 52b heated in the heating step, the glass preform G preheated is supplied and placed on the lower die 52b.

(c) Press-molding Step

In the state where the glass preform G is heated and softened, the lower die 52b is moved upward to press the glass preform G. As a consequence, the molding surfaces of the upper and the lower dies 52a and 52b are transferred onto the glass preform G so that the glass optical element G' having predetermined surface profiles is molded. At this time, with reference to the moving distance corrected by the result of detection by the laser sensor 101, the servo motor 81 is controllably driven.

(d) Cooling/Parting Step

The upper and the lower dies 52a and 52b are cooled down to a preselected temperature and the lower die 52b is moved downward so that the upper and the lower dies 52a and 52b are separated and the glass optical element G' is parted or released.

(e) Removing Step

The glass optical element G' molded into the predetermined shape is removed.

Hereinafter, the above-mentioned steps are repeatedly carried out.

In the press-molding step (c) in this embodiment, a pressing schedule (change with time) may appropriately be selected. For example, after the glass optical element G' reaches a predetermined thickness (the final thickness plus an additional thickness corresponding to the shrinkage by cooling) as a result of pressing, the load is released to make the molding surface of the upper die 52a follow the shrinkage of the glass optical element G'. Alternatively, after pressing until the predetermined thickness, the pressing pressure is reduced and a reduced pressure is maintained to press the glass optical element G' until the final thickness is reached. In this event, the mold position at which the final thickness is reached can be controlled by this invention.

Furthermore, a plurality of times of pressing can be carried out, for example, by carrying out a first pressing operation, then reducing or releasing the pressure, and thereafter carrying out a second pressing operation.

For example, the first pressing operation is carried out to push the lower die until the glass optical element G' has a thickness greater by about 5% than the final thickness. Then, the pressure is reduced and the cooling is started, maintaining a holding position of the lower die. At the time instant when the mold temperature reaches a level around Ts (sagging point), the second pressing operation is carried out. At a temperature not higher than Tg, parting is carried out. In this manner, it is possible to achieve an excellent surface accuracy of the glass optical element to be molded. Depending upon the shape of a lens to be molded, the pressure control and the temperature schedule may appropriately be selected. In particular, the above-mentioned control is effective for optical elements, such as a concave meniscus lens and a biconcave lens. In case where a plurality of stages of pressing are carried out as mentioned above, the holding position of the lower die in the respective stages can be changed by reflecting the displacement measured by the laser sensor 101 in the driving amount of the servo motor 81.

Next, description will be made of a comparative example and examples of this invention in conjunction with the result of press-molding of a glass molded product.

COMPARATIVE EXAMPLE

In the comparative example, concave meniscus lenses were continuously molded by press-molding a glass material M-BaCD 12 manufactured by HOYA.

The temperature of each of the upper and the lower dies 52a and 52b was elevated to 546° C. (corresponding to the viscosity of $10^{9.7}$ poises as the viscosity of the glass material). The glass preform G preheated in the heating chamber 20 to 634° C. (corresponding to $10^{6.7}$ poises) was transported by the transport handler 23 in a floating state and dropped onto the lower die 52b. Immediately thereafter, the servo motor 81 was driven to move the lower die 52b upward. To the position corresponding to the thickness greater by 5% than the final thickness of the lens to be molded, press-molding was carried out under the load of 100 kg/cm².

Next, the pressing force of the lower die 52b was reduced to 20 kg/cm² and cooling was started, maintaining the holding position of the lower die 52b. According to a predetermined cooling program, the second pressing operation was started under the load of 60 kg/cm² at the time instant when the lens was cooled to the sagging point. By the second pressing operation, the thickness of the lens fell within a predetermined tolerance.

Then, at the time instant when the lens was cooled to a temperature not higher than Tg (transition temperature), the lower die 52b was moved downward to release the lens. The lens was removed by the delivery handler 32. After removal, the upper and the lower dies 52a and 52b were heated again for a next press-molding cycle. By continuously repeating the press-molding cycle having a cycle time of 160 seconds, the concave meniscus lenses were molded. At this time, on the inner wall of the molding chamber 30, cooling water was circulated through the copper pipes 91a through 96a illustrated in FIG. 2 to perform water cooling.

Figure 4:
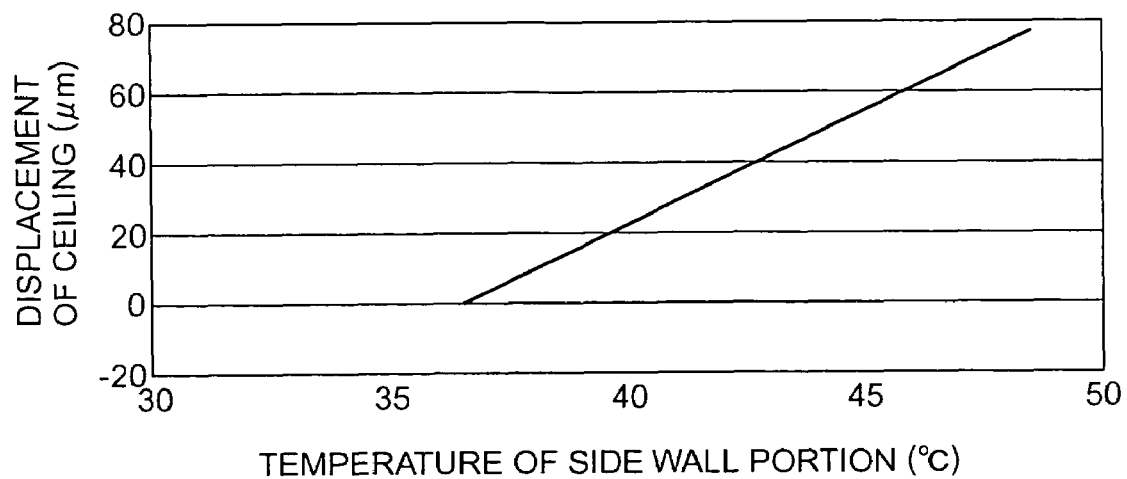
FIG. 4 is a graph showing the relationship between the temperature of a side wall portion and the thermal displacement of a ceiling portion.

Referring to FIG. 4, illustrated is a graph showing the relationship between the temperature of the side wall portion 62 and the thermal displacement of the ceiling portion 61. In case where press-molding was continuously carried out for two hours, the displacement of the ceiling portion 61 was equal to +78 μm with respect to an initial position at the start of press-molding as a reference (0 μm). The temperature of the side wall portion 62 was elevated to 48° C. with respect to an initial temperature at the start of press-molding as a reference (36° C.). In the continuous press-molding, the temperature of the side wall portion and the displacement of the ceiling portion had a substantially linear relationship.

Figure 5:
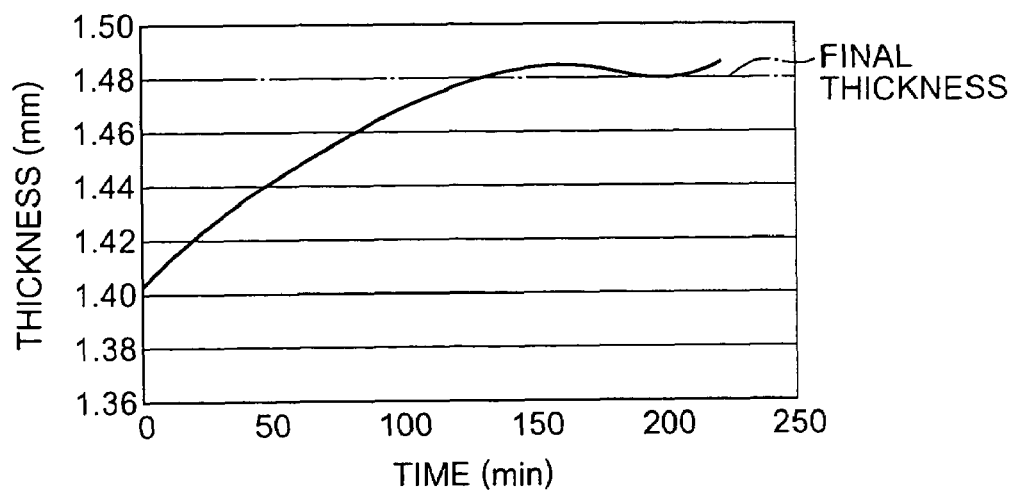
FIG. 5 is a graph showing the change in thickness of a glass lens in a comparative example in case where the glass lens is press-molded according to a known technique.

Referring to FIG. 5, illustrated is a graph showing the change in thickness of the lens in case where the lens was molded in the comparative example without correcting the moving distance of the lower die 52b.

After the start of continuous press-molding, the thickness of the lens was increased with temperature elevation of the structure member of the molding chamber 30 and reaches a substantially stable condition after lapse of about 150 minutes. At this time, the thickness of the lens substantially falls within a specification value (1.50±0.05 mm in this example). During the first half of the 150 minutes, however, the thickness was beyond the tolerance (smaller than 1.45 mm in this example).

Example 1

At every press-molding cycle, the result of detection by the laser sensor 101 was fed back to the control section for controlling the servo motor 81 to correct the movement of the lower die 52b. Except that the holding position of the lower die during the first pressing operation was controlled, continuous press-molding was carried out in the manner similar to the comparative example.

Figure 6:
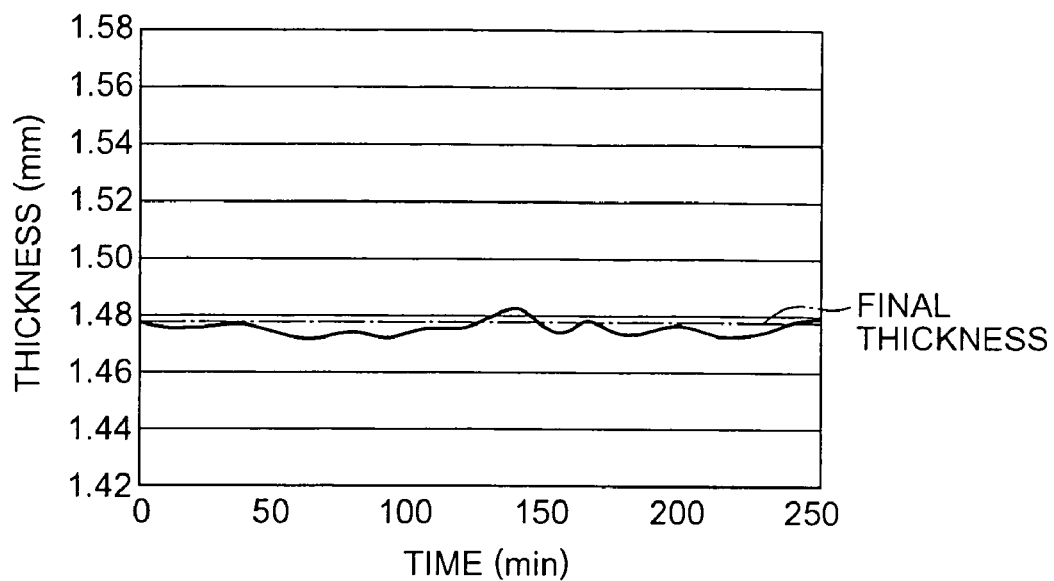
FIG. 6 is a graph showing the change in thickness of a glass lens in an example in case where the glass lens is press-molded according to this invention.

Referring to FIG. 6, the change in thickness of the lens in Example 1 will be described. Until lapse of about 250 minutes after the start of continuous press-molding, the change in thickness of the lens could be suppressed within an extremely small range (not greater than 0.01 mm).

Example 2

Figure 7:
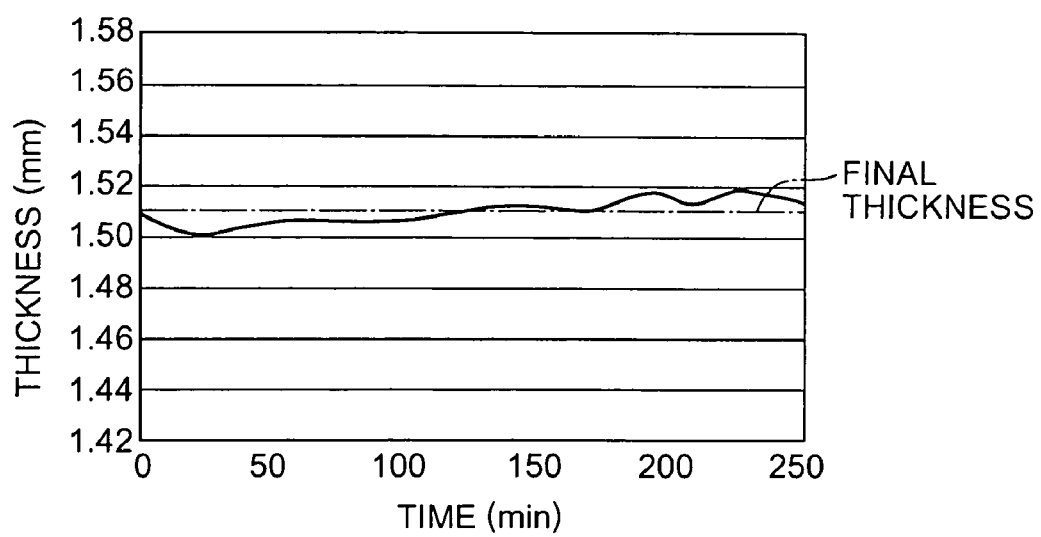
FIG. 7 is a graph showing the change in thickness of a glass lens in another example in case where the glass lens is press-molded according to this invention.

Instead of the laser sensor 101, the temperature sensors 103 and 104 were used. The results of detection by the temperature sensors 103 and 104 were fed back to the control section for controlling the servo motor 81. Except the above, continuous press-molding was carried out in the manner similar to Example 1. In this example, use was made of the relationship between the wall temperature of the molding chamber and the displacement of the ceiling position as preliminarily obtained. As shown in FIG. 7, the change in thickness of the lens from the start to the lapse of 250 minutes could be suppressed within a range not greater than 0.02 mm.

Although this invention has been described so far in conjunction with a few preferred embodiments thereof, this invention is not restricted to the foregoing embodiments at all.

For example, in the first embodiment of this invention, the thermal displacement of the ceiling portion 61 is detected by detecting the position of the flange portion 71a of the support post 71 supporting the upper die 52a by the use of the detecting means, such as the laser sensor 101. Alternatively, the thermal displacement of a different part of the ceiling portion 61 may be detected, provided that the thermal displacement of the ceiling portion 61 following the thermal deformation of the side wall portion 62 can be detected.

Furthermore, a rod-like detecting member changed in position following the thermal displacement of the ceiling portion 61 may be protruded outward from the ceiling portion 61. The detecting means such as the laser sensor 101 detects an end of the detecting member. With this structure, the supporting member 102 supporting the laser sensor 101 is advantageously separated from the heat source.

In the foregoing embodiments, the housing of the molding chamber 30 is taken as an example of the structure member exhibiting thermal deformation. The side wall portion 62 is taken as an example of a portion forming the housing and exhibiting the thermal deformation. As an example of a portion exhibiting thermal displacement following the thermal deformation of the side wall portion 62, the ceiling portion 61 is cited. However, the structure member exhibiting thermal deformation and affecting the positional accuracy of the mold is not limited to the housing. The portion exhibiting thermal displacement to be detected is not limited to the ceiling portion 61 of the housing. The portions provided with the temperature sensors 103 and 104 and the laser sensor 101 are not limited to the side wall portion 62 and the ceiling portion 61.

By applying this invention to the technique of the above-mentioned prior art, higher-accuracy press-molding can be carried out.

Furthermore, the foregoing description is directed to the case where the glass material is press-molded. However, this invention is applicable to other materials than the glass material, such as a resin or a metal, provided that a press-molded product having a predetermined shape is molded by similar press-molding.

In this invention, it is also possible to detect the temperature of the structure member and to predict the change in rigidity following the temperature change of the structure member. Reflecting the change in rigidity in the correction value, more precise press-molding can be carried out.

According to this invention, the change in position of the portion exhibiting thermal displacement resulting from the thermal deformation of the structure member is fed back to the control section for controlling the servo motor as a driving portion. Therefore, it is possible to accurately control the thickness of the lens from the start of continuous press-molding. In addition, against the change in environment such as the temperature of the atmosphere, it is possible to suppress the variation and produce the product within the tolerance.

According to this invention, control of the dimension such as the thickness of the lens does not require the contact between the dies or the contact between the die and another member such as the stopper. Therefore, the pressing schedule during pressing can freely be selected. In addition, it is possible to control the mold position varied by the thermal shrinkage following the cooling of the press-molding material after molding. Therefore, it is possible to avoid the problem such as occurrence of sink marks and deterioration in surface accuracy. Particularly, it is possible to press-mold the glass optical element having a concave meniscus shape or a biconcave shape with high accuracy.

Thus, according to this invention, a high-quality molded product can be molded with a high productivity. This invention is suitable for production of the glass optical element required to have a high surface accuracy.

What is claimed is:

1. A method for press-molding a glass optical element by use of an apparatus, said apparatus including; a mold comprising a first die and a second die, each of said dies having a molding surface facing with the other, said first die being fixed to a structure member of the apparatus and said second die being movable; driving means for moving the second die toward and away from the first die; heating means; detecting means; and a controller, said method comprising:

supplying said mold with a glass preform between the first die and the second die, press-molding the glass preform with the first die and the second die, heating the first and second dies by the heating means, detecting a displacement of a part of the structure member by the detecting means, calculating a correction value for a moving distance of the second die based on the detected displacement by the controller, and controlling the driving means so that the second die moves a distance in accordance with the correction value by the controller.

2. The method of claim 1 wherein the glass preform is preliminarily heated and softened and has a predetermined shape.

3. The method of claim 1 wherein the structure member of the apparatus is a housing forming the apparatus or a supporting member supporting the mold.

4. A method for press-molding a glass optical element by use of an apparatus, said apparatus including; a mold comprising first die and a second die, each of said dies having a molding surface facing with the other, said first die being fixed to a structure member of the apparatus and said second die being movable; driving means for moving the second die toward and away from the first die; heating means; temperature detecting means; memory means for storing values of displacement in association with temperatures of a part of the structure member; and a controller;

said method comprising:

supplying said mold with a glass perform between the first die and the second die, press-molding the material with the first die and the second die, heating the first and second dies by the heating means, detecting the temperature of the part of the structure member by the temperature detecting means, obtaining a correction value for a moving distance of the second die based on information including the detected temperature and the value of the displacement corresponding to the detected temperature as stored in the memory by the controller, and controlling the driving means so that the second die moves a distance in accordance with the correction value by the controller.

5. The method of claim 4 wherein the glass preform is preliminarily heated and softened and has a predetermined shape.

6. The method of claim 4 wherein the structure member of the apparatus is a housing forming the apparatus or a supporting member supporting the mold.

* * * * *